US009718953B2

(12) United States Patent
Jogo et al.

(10) Patent No.: US 9,718,953 B2
(45) Date of Patent: *Aug. 1, 2017

(54) HYDROGENATED BLOCK COPOLYMER AND COMPOSITION COMPRISING SAME

(71) Applicant: KURARAY CO., LTD., Kurashiki-shi (JP)

(72) Inventors: Yosuke Jogo, Ibaraki (JP); Kenji Shachi, Ibaraki (JP); Nobuhiro Moriguchi, Ibaraki (JP)

(73) Assignee: KURARAY CO., LTD., Kurashiki-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/058,519

(22) Filed: Mar. 2, 2016

(65) Prior Publication Data

US 2016/0177083 A1 Jun. 23, 2016

Related U.S. Application Data

(63) Continuation of application No. 13/984,941, filed as application No. PCT/JP2012/053330 on Feb. 14, 2012, now Pat. No. 9,321,874.

(30) Foreign Application Priority Data

Feb. 14, 2011 (JP) .................................. 2011-028767

(51) Int. Cl.
*C08L 53/02* (2006.01)
*C08F 293/00* (2006.01)
*C08F 297/04* (2006.01)

(52) U.S. Cl.
CPC .......... *C08L 53/025* (2013.01); *C08F 293/00* (2013.01); *C08F 297/046* (2013.01)

(58) Field of Classification Search
None
See application file for complete search history.

(56) References Cited

U.S. PATENT DOCUMENTS

| 9,321,874 B2* | 4/2016 | Jogo ..................... C08L 53/025 |
| 2003/0083422 A1 | 5/2003 | Chen |
| 2004/0068040 A1 | 4/2004 | Chen |
| 2009/0061248 A1 | 3/2009 | Hoshi et al. |
| 2009/0247688 A1 | 10/2009 | Jogo et al. |
| 2011/0319837 A1 | 12/2011 | Uehara et al. |
| 2012/0136114 A1 | 5/2012 | Nishikawa |

FOREIGN PATENT DOCUMENTS

| JP | 3-188114 A | 8/1991 |
| JP | 2000-256684 A | 9/2000 |
| JP | 2003-34738 A | 2/2003 |
| JP | 2003-509564 A | 3/2003 |
| JP | 2003-509565 A | 3/2003 |
| WO | WO 2006/109743 A1 | 10/2006 |
| WO | WO 2007/119390 A1 | 10/2007 |
| WO | WO 2010/104068 A1 | 9/2010 |

OTHER PUBLICATIONS

International Search Report issued May 22, 2012, in PCT/JP2012/053330.
Extended European Search Report issued Aug. 7, 2014, in European Patent Application No. 12747755.2.

* cited by examiner

*Primary Examiner* — Jeffrey Mullis
(74) *Attorney, Agent, or Firm* — Oblon, McClelland, Maier & Neustadt, L.L.P.

(57) ABSTRACT

A thermoplastic elastomer composition includes a hydrogenated block copolymer, which is obtained by hydrogenating a block copolymer having two or more polymer blocks (a) each containing a structural unit derived from an aromatic vinyl compound and one or more polymer blocks (b) each containing structural units derived from isoprene and 1,3-butadiene, a thermoplastic resin, and a rubber softener. The hydrogenated block copolymer has a crystallization peak temperature (Tc) of −3 to 15° C.

17 Claims, No Drawings

HYDROGENATED BLOCK COPOLYMER AND COMPOSITION COMPRISING SAME

CROSS REFERENCE TO RELATED APPLICATIONS

This application is a continuation of U.S. patent application Ser. No. 13/984,941, filed Aug. 12, 2013, which is the U.S. National Stage of International Patent Application No. PCT/JP2012/053330, filed Feb. 14, 2012, the disclosures of which are incorporated herein by reference in their entireties. This application claims priority to Japanese Patent Application No. 2011-028767, filed Feb. 14, 2011, the disclosure of which is incorporated herein by reference in its entirety.

TECHNICAL FIELD

The present invention relates to a hydrogenated block copolymer excellent in both tensile strength and elastic recovery, and having good abrasion resistance, and a thermoplastic elastomer composition containing the hydrogenated block copolymer.

BACKGROUND ART

Of the hydrogenated block copolymers, a hydrogenated styrene-based thermoplastic elastomer is a thermoplastic elastomer excellent in weatherability, heat resistance, impact resistance, flexibility, and elastic recovery. A composition containing a hydrogenated block copolymer has been utilized in a wide variety of fields such as automobile supplies, home appliances, medical supplies, construction supplies, toys, daily necessities, and miscellaneous goods because the composition imparts an excellent mechanical strength, flexibility, weatherability, ozone resistance, heat stability, and transparency. In such circumstances, a hydrogenated product of a block copolymer obtained by copolymerizing a mixed monomer of isoprene and butadiene with styrene has been proposed for the purpose of improving the low-temperature characteristic, impact resistance, permanent set property, and mechanical strength of the hydrogenated styrene-based thermoplastic elastomer (see Patent Literature 1).

In addition, upon utilization of the excellent flexibility and elastic recovery of the hydrogenated styrene-based thermoplastic elastomer, a method involving mixing the elastomer with a plasticizer or various thermoplastic resins before its use has been proposed. For example, the following compositions have been proposed as such hydrogenated styrene-based thermoplastic elastomer composition: a composition formed of 20 to 80 wt % of an elastomer-like block copolymer, 5 to 60 wt % of a process oil, and 3 to 60 wt % of a vinylarene resin (see Patent Literature 2); a composition containing 52 to 60 wt % of a block polymer having at least two polystyrene terminal blocks and a mid block formed of a hydrogenated polymerized diene whose vinyl content is 45 wt % or less, 19 to 28 wt % of an oil, and 13 to 22 wt % of a polystyrene (see Patent Literature 3); and a composition formed of 35 to 50 parts by mass of a hydrogenated block copolymer having an aromatic vinyl content of 35 to 45 mass % and a weight-average molecular weight of 70,000 to 120,000, 30 to 50 parts by mass of a softener for a rubber, and 5 to 25 parts by mass of a polystyrene-based resin having a weight-average molecular weight of 100,000 to 400,000 (see Patent Literature 4).

CITATION LIST

Patent Literature

[Patent Document 1] JP H03-188114 A
[Patent Document 2] JP 2003-509565
[Patent Document 3] JP 2003-509564
[Patent Document 4] WO 2007/119390 A1

SUMMARY OF INVENTION

Technical Problem

However, the hydrogenated block copolymer disclosed in Patent Document 1, and the thermoplastic elastomer compositions disclosed in Patent Document 2 to 4 have had room for further improvement because the copolymer and compositions to be obtained are not necessarily satisfactory in terms of both tensile strength and elastic recovery.

In addition, the hydrogenated styrene-based thermoplastic elastomer has started to be used as an alternative material to soft vinyl chloride used in, for example, automobile parts, home appliance parts, building materials, furniture, toys, sporting goods, and daily necessities, but the elastomer has involved the following problem. The elastomer is inferior in abrasion resistance to the soft vinyl chloride.

In view of the foregoing, an object of the present invention is to provide a hydrogenated block copolymer and a thermoplastic elastomer composition each of which is excellent in both tensile strength and elastic recovery, and has good abrasion resistance.

Solution to Problem

The inventors of the present invention have made extensive studies to solve the problems, and as a result, have found that, in a hydrogenated block copolymer obtained by hydrogenating a block copolymer having two or more polymer blocks (a) each containing a structural unit derived from an aromatic vinyl compound and one or more polymer blocks (b) each containing structural units derived from isoprene and 1,3-butadiene (hereinafter sometimes simply referred to as "butadiene"), increasing the ratio of the structural unit derived from butadiene to the structural unit derived from isoprene in each polymer block (b) increases a tensile strength but tends to reduce elastic recovery, and hence the problems are not necessarily solved merely by controlling the ratio between the structural unit derived from isoprene and the structural unit derived from butadiene, and that the problems cannot be solved until the control is performed so that the hydrogenated block copolymer may have a specific crystallization peak temperature.

That is, the present invention relates to the following items (1) to (7).

(1) A hydrogenated block copolymer, which is obtained by hydrogenating a block copolymer having two or more polymer blocks (a) each containing a structural unit derived from an aromatic vinyl compound and one or more polymer blocks (b) each containing structural units derived from isoprene and 1,3-butadiene, in which the hydrogenated block copolymer has a crystallization peak temperature (Tc) defined as described below of −3 to 15° C.:

(Crystallization Peak Temperature (Tc))

a peak top temperature of an exothermic peak observed when the temperature of a sample is increased from 30° C. to 150° C. at a rate of temperature increase of 10° C./min and then the sample is cooled to −100° C. at a rate of temperature decrease of 10° C./min, the peak top temperature being measured with differential scanning calorimeter (DSC), is defined as the crystallization peak temperature (Tc).

(2) The hydrogenated block copolymer according to the above-mentioned item (1), in which a mass ratio (isoprene/ 1,3-butadiene) of the structural unit derived from isoprene to the structural unit derived from 1,3-butadiene is 49.9/50.1 to 40.1/59.9.

(3) The hydrogenated block copolymer according to the above-mentioned item (1) or (2), in which the content of the polymer blocks (a) in the hydrogenated block copolymer (A) is 20 to 34 mass %.

(4) A thermoplastic elastomer composition, comprising: the hydrogenated block copolymer (A) according to any one of the above-mentioned items (1) to (3); and a thermoplastic resin (B).

(5) A thermoplastic elastomer composition, including: the hydrogenated block copolymer (A) according to any one of the above-mentioned items (1) to (3); a thermoplastic resin (B); and a softener for a rubber (C).

(6) The thermoplastic elastomer composition according to the above-mentioned item (5), in which in 100 parts by mass of the total of the hydrogenated block copolymer (A), the thermoplastic resin (B), and the softener for a rubber (C), the content of the hydrogenated block copolymer (A) is 50 to 80 parts by mass, the content of the thermoplastic resin (B) is 5 to 30 parts by mass, and the content of the softener for a rubber (C) is 10 to 45 parts by mass.

(7) The thermoplastic elastomer composition according to the above-mentioned item (5) or (6), in which the thermoplastic resin (B) comprises a polystyrene-based resin (B').

Advantageous Effects of Invention

According to one embodiment of the present invention, it is possible to provide the hydrogenated block copolymer and the thermoplastic elastomer composition containing the hydrogenated block copolymer, each of which is excellent in both tensile strength and elastic recovery, and has good abrasion resistance.

DESCRIPTION OF EMBODIMENTS (Hydrogenated Block Copolymer (A))

A hydrogenated block copolymer (A) of the present invention is a hydrogenated block copolymer, which is obtained by hydrogenating a block copolymer having two or more polymer blocks (a) each containing a structural unit derived from an aromatic vinyl compound and one or more polymer blocks (b) each containing structural units derived from isoprene and 1,3-butadiene (hereinafter simply referred to as butadiene), in which the hydrogenated block copolymer has a crystallization peak temperature (Tc) defined as described below of −3 to 15° C.:

(Crystallization Peak Temperature (Tc))

a peak top temperature of an exothermic peak observed when a temperature of a sample is increased from 30° C. to 150° C. at a rate of temperature increase of 10° C./min and then the sample is cooled to −100° C. at a rate of temperature decrease of 10° C./min, the peak top temperature being measured with differential scanning calorimeter (DSC), is defined as the crystallization peak temperature (Tc).

The crystallization peak temperature in the hydrogenated block copolymer (A) needs to be −3 to 15° C. as described in the foregoing from the viewpoints of achieving compatibility between a tensile strength and elastic recovery, and obtaining good abrasion resistance, and is preferably 0 to 14° C., more preferably 0 to 13° C., still more preferably 2 to 13° C., particularly preferably 5 to 13° C., most preferably 5 to 11° C. When the crystallization peak temperature is less than −3° C., the hydrogenated block copolymer and a thermoplastic elastomer composition containing the copolymer are each poor in tensile strength. When the temperature exceeds 15° C., the hydrogenated block copolymer and the thermoplastic elastomer composition are each poor in elastic recovery.

The polymer blocks (a) in the hydrogenated block copolymer (A) each contain preferably 50 mass % or more, more preferably 80 mass % or more, still more preferably 90 mass % or more, still further more preferably 95 mass % or more, particularly preferably substantially 100 mass % of the structural unit derived from the aromatic vinyl compound. The phrase "derived from the aromatic vinyl compound" as used herein means that the structural unit is a structural unit formed as a result of the addition polymerization of the aromatic vinyl compound. Hereinafter, the term "derived" is used in the same meaning.

Examples of the aromatic vinyl compound include styrene, α-methylstyrene, 2-methylstyrene, 3-methylstyrene, 4-methylstyrene, 4-propylstyrene, 4-cyclohexylstyrene, 4-dodecylstyrene, 2-ethyl-4-benzylstyrene, 4-(phenylbutyl) styrene, vinyltoluene, 1-vinylnaphthalene, and 2-vinylnaphthalene. Of those, styrene and α-methylstyrene are preferred, and styrene is more preferred. Each of the polymer blocks (a) may be constituted only of one kind of those aromatic vinyl compounds, or may be constituted of two or more kinds thereof.

In addition, a structural unit except the structural unit derived from the aromatic vinyl compound in each of the polymer blocks (a) is, for example, a structural unit derived from any other polymerizable monomer such as a structural unit derived from a conjugated diene like isoprene, butadiene, 2,3-dimethyl-butadiene, 1,3-pentadiene, or 1,3-hexadiene.

The polymer block (b) in the hydrogenated block copolymer (A) contains preferably 50 mass % or more, more preferably 80 mass % or more, still more preferably 90 mass % or more, still further more preferably 95 mass % or more, particularly preferably substantially 100 mass % of the structural units derived from isoprene and butadiene. The polymerization form of the polymer block (b) is not particularly limited, and each of random polymerization and block polymerization is permitted.

In addition, the mass ratio (isoprene/butadiene) of the structural unit derived from isoprene to the structural unit derived from butadiene in the polymer block (b) is preferably 49.9/50.1 to 40.1/59.9, more preferably 49/51 to 41/59, still more preferably 48/52 to 42/58 from the viewpoints of facilitating the achievement of the compatibility between the tensile strength and the elastic recovery, and obtaining good abrasion resistance. As described in Examples, the mass ratio is a value determined by using the block copolymer before the hydrogenation from $^1$H-NMR spectrum. It should be noted that as long as the crystallization peak temperature falls within the specific range, the compatibility between the tensile strength and the elastic recovery can be achieved irrespective of the mass ratio. On the other hand, as long as the crystallization peak temperature deviates from the specific range, the compatibility between the tensile strength and the elastic recovery cannot be achieved even when the mass ratio falls within the range.

In addition, the bonding form of isoprene and butadiene in the polymer block (b), i.e., the so-called microstructure is not particularly limited. For example, in the case of isoprene, any one of the bonding forms, i.e., a 1,2-bond (vinyl bond), a 3,4-bond (vinyl bond), and a 1,4-bond can be adopted, and in the case of butadiene, any one of the bonding forms, i.e., the 1,2-bond (vinyl bond) and the 1,4-bond can be adopted. Only one kind of those bonding forms may be present, or two or more kinds thereof may be present. In addition, each of those bonding forms may be present at any ratio, but from the viewpoint of the tensile strength, the amount of the 1,4-bonds formed of the structural units of isoprene and butadiene is preferably 60% or more, more preferably 80% or more, still more preferably 85% or more, particularly preferably 90% or more (more specifically 90 to 95%).

It should be noted that the amount of the 1,4-bonds in this description is a value determined according to a method described in Examples by using the block copolymer before the hydrogenation from $^1$H-NMR spectrum.

In addition, examples of the structural unit except the structural units derived from isoprene and butadiene in the polymer block (b) include structural units derived from other polymerizable monomers, such as structural units derived from conjugated dienes such as 2,3-dimethylbutadiene, 1,3-pentadiene, and 1,3-hexadiene, and structural units derived from aromatic vinyl compounds such as styrene, α-methylstyrene, 2-methylstyrene, 3-methylstyrene, 4-methylstyrene, 4-propylstyrene, 4-cyclohexylstyrene, 4-dodecylstyrene, 2-ethyl-4-benzylstyrene, 4-(phenylbutyl)styrene, vinyltoluene, 1-vinylnaphthalene, and 2-vinylnaphthalene.

In the polymer block (b) in the hydrogenated block copolymer (A) of the present invention, preferably 50% or more, more preferably 80% or more, still more preferably 90% or more, still further more preferably 95% or more, particularly preferably 96 to 100% of carbon-carbon double bonds derived from isoprene and butadiene are hydrogenated from the viewpoints of heat resistance, weatherability, and the tensile strength.

It should be noted that the hydrogenation ratio is a value determined from measured values obtained by measuring the contents of the carbon-carbon double bonds derived from isoprene and butadiene in the polymer block (b) before and after the hydrogenation with $^1$H-NMR spectrum.

The hydrogenation of the carbon-carbon double bonds causes the polymer block (b) to have crystallinity. The crystallization peak temperature of the hydrogenated block copolymer (A) can be set within the specific range by comprehensively adjusting, for example, the content of butadiene in the polymer block (b), the randomness of an isoprene-butadiene chain, the microstructure, and the hydrogenation ratio.

In general, the crystallinity is observed when about twelve methylene groups are linearly linked. In other words, the crystallinity is observed when a completely hydrogenated chain in which three butadiene molecules are linked through 1,4-bonds is present. In contrast, when a 1,4-bonded polyisoprene is completely hydrogenated, the polyisoprene is of an ethylene-propylene alternating copolymer structure and hence does not have crystallinity. In view of the foregoing, to increase the content of butadiene, to increase a butadiene chain, to increase the amount of the 1,4-bonds, and to increase the hydrogenation ratio are each effective in raising the crystallization peak temperature, and to increase the content of isoprene, to raise the randomness of the isoprene-butadiene chain, to reduce the amount of the 1,4-bonds, and to reduce the hydrogenation ratio are each effective in lowering the crystallization peak temperature.

Further, the crystallization peak temperature of the hydrogenated block copolymer (A) is affected by a temperature at the time of a polymerization reaction in the polymer block (b) and the rate at which isoprene or butadiene is supplied. Accordingly, those values need to be appropriately adjusted for obtaining a desired crystallization peak temperature. In other words, the crystallization peak temperature of the hydrogenated block copolymer (A) can be controlled to the specific value by controlling the temperature at the time of the polymerization reaction, the mass ratio between isoprene and butadiene, and the rates at which isoprene and butadiene are supplied.

The content of the polymer blocks (a) in the hydrogenated block copolymer (A) is preferably 10 to 34 mass's, more preferably 12 to 34 mass %, still more preferably 15 to 34 mass %, still further more preferably 20 to 34 mass %, particularly preferably 25 to 34 mass %, most preferably 25 to 33 mass %. When the content of the polymer blocks (a) in the hydrogenated block copolymer (A) is 10 mass % or more, the hydrogenated block copolymer and the thermoplastic elastomer composition are each excellent in tensile strength. On the other hand, when the content is 34 mass % or less, the copolymer and the composition are each excellent in elastic recovery.

It should be noted that the content of the polymer blocks (a) in the hydrogenated block copolymer (A) is determined from $^1$H-NMR spectrum after the hydrogenation.

The bonding mode of the polymer blocks (a) and polymer block (b) in the hydrogenated block copolymer (A) may be any one of a linear mode, a branched mode, a radial mode, and an arbitrary combination thereof.

For example, when the polymer block (a) is represented by "A" and the polymer block (b) is represented by "B," a triblock copolymer represented by "A-B-A," a tetrablock copolymer represented by "A-B-A-B," a pentablock copolymer represented by "A-B-A-B-A" or "B-A-B-A-B," and a (A-B)nX-type copolymer (where X represents a coupling agent residue and n represents an integer of 2 or more), and the like are given. Of those, a triblock copolymer represented by "A-B-A" or a tetrablock copolymer represented by "A-B-A-B" is preferred as the hydrogenated block copolymer (A) in terms of ease of production, and a triblock copolymer represented by "A-B-A" is more preferably used.

The weight-average molecular weight (Mw) of the hydrogenated block copolymer (A) is preferably 50,000 to 500,000, more preferably 60,000 to 400,000, still more preferably 65,000 to 300,000, particularly preferably 70,000 to 115,000. When the weight-average molecular weight of the hydrogenated block copolymer (A) is 50,000 or more, the hydrogenated block copolymer (A) and the thermoplastic elastomer composition are each excellent in tensile strength. When the weight-average molecular weight is 500,000 or less, the hydrogenated block copolymer (A) and the thermoplastic elastomer composition each have good moldability.

The molecular weight distribution (Mw/Mn) of the hydrogenated block copolymer (A) is preferably 1.5 or less, more preferably 1.01 to 1.5, still more preferably 1.01 to 1.3, still further more preferably 1.01 to 1.2, particularly preferably 1.01 to 1.1, most preferably 1.01 to 1.05.

It should be noted that the weight-average molecular weight and the molecular weight distribution are values in terms of standard polystyrene determined by gel permeation chromatography (GPC) measurement.

In addition, the glass transition temperature (Tg) of the hydrogenated block copolymer (A) is preferably −60 to −30° C., more preferably −60 to −40° C., still more preferably −55 to −45° C. Further, the crystal melting heat quantity of the hydrogenated block copolymer (A) is preferably 15 to 30 mJ/mg, more preferably 15 to 25 mJ/mg, still more preferably 17 to 25 mJ/mg. The glass transition temperature (Tg) and the crystal melting heat quantity are values measured according to methods described in Examples with differential scanning calorimeter (DSC).

In addition, the tensile strength of the hydrogenated block copolymer (A) measured according to a method described in Examples is about 40 to 45 MPa, and its elastic recovery measured according to a method described in Examples is about 0.3 to 0.5.

It should be noted that the hydrogenated block copolymer (A) may have one or two or more kinds of functional groups such as a carboxyl group, a hydroxyl group, an acid anhydride group, an amino group, and an epoxy group in its molecular chain and/or a molecular terminal thereof as long as an effect of the present invention is not remarkably impaired.

(Method of Producing Hydrogenated Block Copolymer (A))

The hydrogenated block copolymer (A) can be produced by, for example, an anionic polymerization method. Specifically, the copolymer can be produced by: performing a polymerization reaction according to, for example, (1) a method involving sequentially polymerizing the aromatic vinyl compound, and isoprene and butadiene with an alkyllithium compound as an initiator, (2) a method involving sequentially polymerizing the aromatic vinyl compound, and isoprene and butadiene with the alkyllithium compound as an initiator, and then adding a coupling agent to couple the resultant, or (3) a method involving sequentially polymerizing isoprene and butadiene, and then the aromatic vinyl compound with a dilithium compound as an initiator; and then performing a hydrogenation reaction.

It should be noted that isoprene and butadiene may be separately supplied to a reactor at the same time to be turned into a mixture in the reactor, isoprene and butadiene may be supplied to the reactor in a state of being mixed in advance, or both the former method and the latter method may be adopted.

Examples of the alkyl lithium compound include methyllithium, ethyllithium, n-butyllithium, sec-butyllithium, tert-butyllithium, and pentyllithium.

Examples of the coupling agent include: divinylbenzene; polyvalent epoxy compounds such as an epoxidized 1,2-polybutadiene, epoxidized soybean oil, and 1,3-bis(N,N-glycidylaminomethyl)cyclohexane; halogen compounds such as dimethyldichlorosilane, dimethyldibromosilane, trichlorosilane, methyltrichlorosilane, tetrachlorosilane, and tetrachlorotin; ester compounds such as methyl benzoate, ethyl benzoate, phenyl benzoate, diethyl oxalate, diethyl malonate, diethyl adipate, dioctyl adipate, dimethyl phthalate, diethyl phthalate, dimethyl isophthalate, and dimethyl terephthalate; carbonic acid ester compounds such as dimethyl carbonate, diethyl carbonate, and carbonate diphenyl; and alkoxysilane compounds such as dimethyldimethoxysilane, methyltrimethoxysilane, methyltriethoxysilane, tetramethoxysilane, tetraethoxysilane, bis(trimethoxysilyl)hexane, and bis(triethoxysilyl)ethane.

In addition, examples of the dilithium compound include naphthalenedilithium and dilithiohexylbenzene.

The polymerization reaction is preferably performed in the presence of a solvent. The solvent is not particularly limited as long as the solvent is inert to the initiator and does not adversely affect the reaction. Examples thereof include: saturated aliphatic hydrocarbons such as hexane, cyclohexane, heptane, octane, and decane; and aromatic hydrocarbons such as toluene, benzene, and xylene. In addition, the polymerization reaction is performed at preferably 0 to 100° C. (more preferably 30 to 90° C., still more preferably 40 to 80° C., particularly preferably 50 to 80° C.) for preferably 0.5 to 50 hours in ordinary cases from the viewpoint of controlling the microstructure.

In addition, in the polymerization reaction, a Lewis base may be used as a cocatalyst. Examples of the Lewis base include: ethers such as dimethyl ether, diethyl ether, and tetrahydrofuran; glycol ethers such as ethylene glycol dimethyl ether and diethylene glycol dimethyl ether; and amines such as triethylamine, N,N,N',N'-tetramethylethylenediamine, and N-methylmorpholine. One kind of those Lewis bases may be used alone, or two or more kinds thereof may be used in combination.

The hydrogenation reaction may be performed subsequently to the polymerization reaction or the block copolymer may be temporarily isolated after the polymerization reaction before the hydrogenation reaction is performed.

When the block copolymer is temporarily isolated after the polymerization reaction, the block copolymer can be isolated by performing the polymerization according to the method described above and then pouring the resultant polymerization reaction liquid into a poor solvent for the block copolymer such as methanol to coagulate the block copolymer, or pouring the polymerization reaction liquid into hot water together with steam to remove the solvent through azeotropy (steam stripping) and then drying the residue.

The hydrogenation reaction of the block copolymer can be performed by subjecting the block copolymer to a reaction in the presence of a hydrogenation catalyst such as: Raney nickel; a heterogeneous catalyst obtained by causing a support such as carbon, alumina, or diatomaceous earth to carry a metal such as platinum (Pt), palladium (Pd), ruthenium (Ru), rhodium (Rh), or nickel (Ni); a Ziegler type catalyst formed of a combination of a transition metal compound (e.g., nickel octylate, nickel naphthenate, nickel acetylacetonate, cobalt octylate, cobalt naphthenate, or cobalt acetylacetonate) and an organic aluminum compound such as triethylaluminum or triisobutylaluminum, an organic lithium compound, or the like; or a metallocene-based catalyst formed of a combination of bis(cyclopentadienyl) compound of a transition metal such as titanium, zirconium, or hafnium and an organic metal compound including lithium, sodium, potassium, aluminum, zinc, magnesium, or the like generally preferably under the conditions of a reaction temperature of 20 to 200° C. and a hydrogen pressure 0.1 to 20 MPa for 0.1 to 100 hours.

When the polymerization reaction and the hydrogenation reaction are continuously performed, the isolation of the hydrogenated block copolymer (A) can be performed by pouring the hydrogenation reaction liquid into a poor solvent for the hydrogenated block copolymer (A) such as methanol to coagulate the hydrogenated block copolymer (A), or pouring the hydrogenation reaction liquid into hot water together with steam to remove the solvent by azeotropy (steam stripping) and then drying the residue.

According to the present invention, a hydrogenated block copolymer having a tensile strength measured according to the method described in Examples of about 38 to 44 MPa can be obtained. In addition, a hydrogenated block copolymer having an elastic recovery [f (return 100%)/f (outward 100%)] determined according to the method described in Examples of about 0.33 to 0.55 can be obtained. Further, the hydrogenated block copolymer of the present invention has an abrasion resistance measured according to a method described in Examples of about 140 to 147 $mm^3$, in other words, the abrasion resistance is good.

The present invention provides a thermoplastic elastomer composition containing, for example, the hydrogenated block copolymer (A), a thermoplastic resin (B), and as required, a softener for a rubber (C) as well. In the thermoplastic elastomer composition, one kind of the hydrogenated block copolymers (A) may be used alone, or two or more kinds thereof may be used in combination.

(Thermoplastic Resin (B))

Examples of the thermoplastic resin (B) to be incorporated into the thermoplastic elastomer composition of the present invention include a polystyrene-based resin (B'), a polyethylene-based resin, a polypropylene-based resin, an acrylic resin, a polyphenylene ether-based resin, a polycarbonate-based resin, a polyvinyl acetate-based resin, a polyester-based resin, a polyamide-based resin, and a polyvinyl chloride-based resin.

Examples of the polystyrene-based resin (B') can include a polystyrene (general purpose polystyrene (GPPS), high impact polystyrene (HIPS)), a poly-o-methylstyrene, a poly-p-methylstyrene, a polydimethylstyrene, a poly-m-ethylstyrene, a polychlorostyrene, a polyisopropylstyrene, a poly-t-butylstyrene, a poly-α-methylstyrene, a polyethylvinyltoluene, a styrene-maleimide copolymer, a styrene-N-phenylmaleimide copolymer, a styrene-N-phenylmaleimide-acrylonitrile copolymer, a styrene-N-phenylmaleimide-methyl methacrylate copolymer, a styrene-N-phenylmaleimide-butyl acrylate copolymer, rubber-reinforced high impact polystyrene, an acrylonitrile-styrene copolymer (AS resin), an acrylonitrile-butadiene-styrene copolymer (ABS resin), an acrylonitrile-ethylene-propylene rubber-reinforced styrene copolymer (AES resin), an acrylonitrile-polyacrylic acid ester rubber-reinforced styrene copolymer (AAS resin), a methyl methacrylate-styrene copolymer (MS resin), and a methyl methacrylate-butadiene-styrene copolymer (MBS resin).

Examples of the polyethylene-based resin can include: homopolymers of ethylene such as a high-density polyethylene and a low-density polyethylene; and copolymers of ethylene such as ethylene-α-olefin copolymers such as an ethylene-propylene copolymer, an ethylene-1-butene copolymer, an ethylene-1-hexene copolymer, an ethylene-1-heptene copolymer, an ethylene-1-octene copolymer, an ethylene-4-methyl-1-pentene copolymer, an ethylene-1-nonene copolymer, and an ethylene-1-decene copolymer, an ethylene-vinyl acetate copolymer, an ethylene-acrylic acid copolymer, an ethylene-acrylic acid ester copolymer, an ethylene-methacrylic acid copolymer, and an ethylene-methacrylic acid ester copolymer, or resins obtained by modifying these copolymers with maleic anhydride or the like.

Examples of the polypropylene-based resin can include a homopolypropylene, a random polypropylene, and a block polypropylene. Examples of the polyester-based resin include a polyethylene terephthalate, a polybutylene terephthalate, a polylactic acid, and a polycaprolactone. Examples of the polyamide-based resin include a polyamide 6, a polyamide 6/6, a polyamide 6/10, a polyamide 11, a polyamide 12, a polyamide 6/12, a polyhexamethylenediamine terephthalamide, a polyhexamethylenediamine isophthalamide, and a xylene group-containing polyamide.

One kind of the thermoplastic resins (B) may be used alone, or two or more kinds thereof may be used in combination. Of those, a polystyrene-based resin (B') is suitably used.

The weight-average molecular weight of the polystyrene-based resin (B') to be suitably used as the thermoplastic resin (B) falls within the range of 100,000 to 400,000, preferably falls within the range of 120,000 to 350,000, and more preferably falls within the range of 150,000 to 300,000. When the weight-average molecular weight of the polystyrene-based resin (B') is less than 100,000, the stress relaxation property of the thermoplastic elastomer composition to be obtained reduces. When the weight-average molecular weight exceeds 400,000, the moldability of the thermoplastic elastomer composition may reduce.

(Softener for a Rubber (C))

Examples of the softener for a rubber (C) to be incorporated into the thermoplastic elastomer composition of the present invention as required include: mineral oils such as paraffin-based process oil and naphthene-based process oil; plant oils such as peanut oil and rosin; phosphoric acid esters; low-molecular-weight polyethylene glycol; liquid paraffin; and synthetic oils such as low-molecular-weight polyethylene, an ethylene-α-olefin co-oligomer, liquid polybutene, liquid polyisoprene or a hydrogenated product thereof, and liquid polybutadiene or a hydrogenated product thereof. Of those, paraffin-based oil such as paraffin-based process oil or liquid paraffin is suitably used. As the paraffin-based oil, a paraffin-based oil having a kinetic viscosity at 40° C. of 20 to 1,500 mm$^2$/s is preferred, a paraffin-based oil having a dynamic viscosity of 50 to 1,000 mm$^2$/s is more preferred, and a paraffin-based oil having a kinetic viscosity of 70 to 500 mm$^2$/s is still more preferred. One kind of those oils may be used alone, or two or more kinds thereof may be used in combination.

The thermoplastic elastomer composition of the present invention is preferably such that in 100 parts by mass of the total of the hydrogenated block copolymer (A), the thermoplastic resin (B), and the softener for a rubber (C), the content of the hydrogenated block copolymer (A) is 50 to 80 parts by mass, the content of the thermoplastic resin (B) is 5 to 30 parts by mass, and the content of the softener for a rubber (C) is 10 to 45 parts by mass from the following viewpoint: its tensile strength and elastic recovery can be improved in a balanced manner. It is more preferred that in 100 parts by mass of the total of the hydrogenated block copolymer (A), the thermoplastic resin (B), and the softener for a rubber (C), the content of the hydrogenated block copolymer (A) be 55 to 75 parts by mass, the content of the thermoplastic resin (B) be 5 to 20 parts by mass, and the content of the softener for a rubber (C) be 15 to 40 parts by mass.

When the content of the hydrogenated block copolymer (A) is 50 parts by mass or more, the thermoplastic elastomer composition to be obtained is excellent in tensile strength. On the other hand, when the content is 80 parts by mass or less, the moldability of the thermoplastic elastomer composition to be obtained becomes good.

In addition, when the content of the thermoplastic resin (B) is 5 parts by mass or more, the thermoplastic elastomer composition to be obtained is excellent in tensile strength. On the other hand, when the content is 30 parts by mass or less, the moldability of the thermoplastic elastomer composition becomes good.

In addition, when the content of the softener for a rubber (C) is 10 parts by mass or more, the moldability of the thermoplastic elastomer composition to be obtained becomes good. On the other hand, when the content is 45 parts by mass or less, the thermoplastic elastomer composition to be obtained is excellent in tensile strength.

The thermoplastic elastomer composition of the present invention can be blended with any other component in addition to the above-mentioned components depending on purposes as long as the effect of the present invention is not remarkably impaired.

Examples of the other component can include: various additives such as a filler, an antioxidant, a heat stabilizer, a light stabilizer, a UV absorber, a neutralizer, a lubricant, an anti-fogging agent, an anti-blocking agent, a colorant, a flame retardant, an antistatic agent, a crosslinking agent, a conductivity-imparting agent, an antimicrobial agent, and a mildewproofing agent; a thermoplastic resin except the above-mentioned components; and an elastomer except the essential components. In addition, one kind arbitrarily selected from those components may be used alone, or two or more kinds thereof may be used in combination.

The thermoplastic elastomer composition of the present invention can be produced by mixing the hydrogenated block copolymer (A), the thermoplastic resin (B), and as required, the softener for a rubber (C), and the other component to be blended as required. A conventional method can be adopted as the mixing method. For example, it is recommended to mix the components homogeneously using a mixing device such as a high-speed mixer, a ribbon blender, or a V-shaped blender, and then melt and knead the mixture using a kneading device such as a mixing roll, a kneader, a Banbury mixer, a Brabender mixer, or a mono-screw or twin-screw extruder. In general, the kneading is performed at 120 to 280° C.

The tensile strength of the thermoplastic elastomer composition thus obtained measured according to the method described in Examples is about 21.5 to 32 MPa, and its elastic recovery [f (return 100%)/f (outward 100%)] measured according to the method described in Examples is about 0.7 to 0.85.

Various molded articles can be produced by subjecting the resultant thermoplastic elastomer composition to general molding in accordance with various forms.

For example, when the resultant thermoplastic elastomer composition is molded into a film such as an elastic film, the film may be a monolayer film using the thermoplastic elastomer composition of the present invention alone, or may be a multilayer film obtained by extruding the composition together with a thermoplastic resin such as a polyethylene. Known molding technologies such as T-die film molding involving using a monolayer or laminated die, extrusion laminate molding, and co-extrusion molding can each be adopted as a method of producing the monolayer or laminated film. The thickness of the film preferably falls within the range of 15 to 200 μm in ordinary cases.

EXAMPLES

Hereinafter, the present invention is described in detail by way of examples and comparative examples. However, the present invention is not limited to these examples. It should be noted that in each of the following examples and comparative examples, the physical properties of a hydrogenated block copolymer and a thermoplastic elastomer composition were evaluated by the following methods.

(1) Methods of Measuring Crystallization Peak Temperature, Glass Transition Temperature, and Crystal Melting Heat Quantity A crystallization peak temperature was determined from an exothermic peak observed in a temperature decrease process as the following second step with differential scanning calorimeter (DSC), and a glass transition temperature and a crystal melting heat quantity were determined from an endothermic peak observed in a temperature increase process as the following third step with the DSC.
Apparatus: DSC6200 (manufactured by Seiko Instruments Inc.)
Rate of temperature increase: 10° C./min
Rate of temperature decrease: 10° C./min
Nitrogen flow rate: 40 ml/min
Temperature profile:
 1st: 30° C.→150° C. (kept for 5 minutes)
 2nd: 150° C.→−100° C. (kept for 5 minutes)
 3rd: −100° C.→150° C.

(2) Methods of Measuring Hydrogenation Ratio, Styrene Content, Amount of 1,4-Bonds, and Mass Ratio of Structural Unit Derived from Isoprene to Structural Unit Derived from Butadiene Each of the values was determined from $^1$H-NMR spectrum. It should be noted that the mass ratio of a structural unit derived from isoprene to a structural unit derived frombutadiene was measured with a block copolymer before hydrogenation.
Apparatus: JNM-Lambda 500 (manufactured by JEOL Ltd.)
Solvent: deuterated chloroform
Measurement temperature: 50° C.

(3) Method of Measuring Weight-Average Molecular Weight (Mw) and Molecular Weight Distribution (Mw/Mn)

A weight-average molecular weight (Mw) and a molecular weight distribution (Mw/Mn) were determined in terms of standard polystyrene by gel permeation chromatography (GPC).
Apparatus: GPC-8020 (manufactured by TOSOH CORPORATION)
Solvent: tetrahydrofuran
Measurement temperature: 40° C.
Flow rate: 1 ml/min
Injection volume: 150 μl, Concentration: 5 mg/10 cc (hydrogenated block copolymer/THF)

(4) Method of Measuring Tensile Strength

Each of the hydrogenated block copolymers and thermoplastic elastomer compositions obtained in Examples and Comparative Examples was subjected to press molding at 230° C. to provide a sheet having a thickness of about 0.6 mm. A dumbbell test piece (dumbbell No. 3 shape) specified in JIS K6251 was produced from the resultant sheet, and then its tensile strength was measured with a tensile tester "5566 Model" manufactured by Instron at a measurement temperature of 23° C. and a tension speed of 500 mm/min.

(5) Method of Measuring Elastic Recovery

Each of the hydrogenated block copolymers and thermoplastic elastomer compositions obtained in Examples and Comparative Examples was subjected to press molding at 230° C. to provide a sheet having a thickness of about 0.6 mm. A strip-shaped test piece having a width of 25 mm and a length of 150 mm was punched out of the resultant sheet and defined as a test piece. With reference to the "two-cycle hysteresis test" described in the paragraphs [0125] and [0126] of JP 2003-509565 W, the test piece was stretched by 200% with a tensile tester "5566 Model" manufactured by Instron at a chuck-to-chuck distance of 50 mm, a test temperature of 23° C., and a testing speed of 500 mm/min, held in the state for 30 seconds, and then contracted to 0% at a testing speed of 500 mm/min, followed by the measurement of a 100% stretching stress in an advancing direction [f (outward 100%)] and a 100% stretching stress in a returning direction [f (return 100%)] at that time. A ratio between those stresses was determined as represented by the following equation and defined as an indicator of elastic recovery. It should be noted that when the following value is closer to 1, the elastic recovery is more excellent.

Elastic recovery=$f$(return 100%)/$f$(outward 100%)

(6) Method of Measuring DIN Abrasion Volume

Each of the hydrogenated block copolymers obtained in Examples and Comparative Examples was subjected to press molding at 230° C. to provide a sheet having a thickness of about 1 mm. Nine discs each having a diameter of 16 mm were punched out of the resultant sheet and superimposed on one another, and then the resultant was subjected to press molding at 230° C. again to produce a disc-shaped test piece specified in JIS K6264 having a diameter of 16 mm and a thickness of 8 mm. The test piece was evaluated for its abrasion resistance by measuring its abrasion volume (unit: mm$^3$) with a DIN-abrasion tester (manufactured by Toyo Seiki Seisaku-Sho, Ltd.). It should be noted that when the value is smaller, the abrasion resistance is more excellent.

Example 1

3,000 Milliliters of cyclohexane as a solvent and 9.2 ml of sec-butyllithium (cyclohexane solution) having a concentration of 10.5 mass % as an initiator were loaded into a pressure-resistant container that had been replaced with nitrogen and dried, and then the temperature of the mixture was increased to 60° C. After that, 100 ml of styrene were added to the mixture and then the whole was polymerized for 60 minutes.

After that, at the temperature, 4.3 ml of isoprene and 5.7 ml of butadiene were added to the resultant at substantially the same time in one stroke, and then the mixture was subjected to a reaction. After the resultant had been left to stand for 3.8 minutes, the same amounts of isoprene and butadiene as those described in the foregoing were added to the resultant at substantially the same time in one stroke, and then the mixture was subjected to a reaction. The foregoing operations were repeatedly performed to finally add a total of 265 ml of isoprene and a total of 360 ml of butadiene. After that, a reaction was forced for an additional 90 minutes.

Further, at the temperature, 100 ml of styrene were added to the resultant and then the mixture was polymerized for 60 minutes. After that, the polymerization was stopped with 0.52 ml of methanol. Thus, a polymerization reaction liquid containing a block copolymer was obtained.

29.3 Grams of palladium on carbon (palladium-carrying amount: 5 mass %) as a hydrogenation catalyst were added to the reaction mixed liquid, and then a hydrogenation reaction was performed at a hydrogen pressure of 2 MPa and 150° C. for 10 hours. After the resultant had been left standing to cool and the pressure had been discharged, the palladium on carbon was removed by filtration, and then the filtrate was concentrated and vacuum-dried to provide a hydrogenated block copolymer (A-1).

Table 1 shows the results of the measurement of the physical properties of the resultant hydrogenated block copolymer (A-1).

Example 2

3,000 Milliliters of cyclohexane as a solvent and 9.2 ml of sec-butyllithium (cyclohexane solution) having a concentration of 10.5 mass % as an initiator were loaded into a pressure-resistant container that had been replaced with nitrogen and dried, and then the temperature of the mixture was increased to 60° C. After that, 100 ml of styrene were added to the mixture and then the whole was polymerized for 60 minutes.

After that, at the temperature, 4.1 ml of isoprene and 5.9 ml of butadiene were added to the resultant at substantially the same time in one stroke, and then the mixture was subjected to a reaction. After the resultant had been left to stand for 2.9 minutes, the same amounts of isoprene and butadiene as those described in the foregoing were added to the resultant at substantially the same time in one stroke, and then the mixture was subjected to a reaction. The foregoing operations were repeatedly performed to finally add a total of 256 ml of isoprene and a total of 369 ml of butadiene. After that, a reaction was forced for an additional 90 minutes.

Further, at the temperature, 100 ml of styrene were added to the resultant and then the mixture was polymerized for 60 minutes. After that, the polymerization was stopped with 0.52 ml of methanol. Thus, a polymerization reaction liquid containing a block copolymer was obtained.

29.3 Grams of palladium on carbon (palladium-carrying amount: 5 mass %) as a hydrogenation catalyst were added to the reaction mixed liquid, and then a hydrogenation reaction was performed at a hydrogen pressure of 2 MPa and 150° C. for 10 hours. After the resultant had been left standing to cool and the pressure had been discharged, the palladium on carbon was removed by filtration, and then the filtrate was concentrated and vacuum-dried to provide a hydrogenated block copolymer (A-2).

Table 1 shows the results of the measurement of the physical properties of the resultant hydrogenated block copolymer (A-2).

Example 3

3,000 Milliliters of cyclohexane as a solvent and 8.2 ml of sec-butyllithium (cyclohexane solution) having a concentration of 10.5 mass % as an initiator were loaded into a pressure-resistant container that had been replaced with nitrogen and dried, and then the temperature of the mixture was increased to 55° C. After that, 100 ml of styrene were added to the mixture and then the whole was polymerized for 60 minutes.

After that, at the temperature, 4.5 ml of isoprene and 5.5 ml of butadiene were added to the resultant at substantially the same time in one stroke, and then the mixture was subjected to a reaction. After the resultant had been left to stand for 2.1 minutes, the same amounts of isoprene and butadiene as those described in the foregoing were added to the resultant at substantially the same time in one stroke, and then the mixture was subjected to a reaction. The foregoing operations were repeatedly performed to finally add a total of 255 ml of isoprene and a total of 313 ml of butadiene. After that, a reaction was forced for an additional 90 minutes.

Further, at the temperature, 100 ml of styrene were added to the resultant and then the mixture was polymerized for 60 minutes. After that, the polymerization was stopped with 0.46 ml of methanol. Thus, a polymerization reaction liquid containing a block copolymer was obtained.

27.4 Grams of palladium on carbon (palladium-carrying amount: 5 mass %) as a hydrogenation catalyst were added to the reaction mixed liquid, and then a hydrogenation reaction was performed at a hydrogen pressure of 2 MPa and 150° C. for 10 hours. After the resultant had been left standing to cool and the pressure had been discharged, the palladium on carbon was removed by filtration, and then the filtrate was concentrated and vacuum-dried to provide a hydrogenated block copolymer (A-3).

Table 1 shows the results of the measurement of the physical properties of the resultant hydrogenated block copolymer (A-3).

Example 4

3,000 Milliliters of cyclohexane as a solvent and 9.5 ml of sec-butyllithium (cyclohexane solution) having a concentration of 10.5 mass % as an initiator were loaded into a pressure-resistant container that had been replaced with nitrogen and dried, and then the temperature of the mixture was increased to 55° C. After that, 100 ml of styrene were added to the mixture and then the whole was polymerized for 60 minutes.

After that, at the temperature, 4.3 ml of isoprene and 5.7 ml of butadiene were added to the resultant at substantially the same time in one stroke, and then the mixture was subjected to a reaction. After the resultant had been left to stand for 1.6 minutes, the same amounts of isoprene and butadiene as those described in the foregoing were added to the resultant at substantially the same time in one stroke, and then the mixture was subjected to a reaction. The foregoing operations were repeatedly performed to finally add a total of 268 ml of isoprene and a total of 356 ml of butadiene. After that, a reaction was forced for an additional 90 minutes.

Further, at the temperature, 100 ml of styrene were added to the resultant and then the mixture was polymerized for 60 minutes. After that, the polymerization was stopped with 0.54 ml of methanol. Thus, a polymerization reaction liquid containing a block copolymer was obtained.

29.3 Grams of palladium on carbon (palladium-carrying amount: 5 mass %) as a hydrogenation catalyst were added to the reaction mixed liquid, and then a hydrogenation reaction was performed at a hydrogen pressure of 2 MPa and 150° C. for 10 hours. After the resultant had been left standing to cool and the pressure had been discharged, the palladium on carbon was removed by filtration, and then the filtrate was concentrated and vacuum-dried to provide a hydrogenated block copolymer (A-4).

Table 1 shows the results of the measurement of the physical properties of the resultant hydrogenated block copolymer (A-4).

Example 5

3,000 Milliliters of cyclohexane as a solvent and 9.3 ml of sec-butyllithium (cyclohexane solution) having a concentration of 10.5 mass as an initiator were loaded into a pressure-resistant container that had been replaced with nitrogen and dried, and then the temperature of the mixture was increased to 55° C. After that, 100 ml of styrene were added to the mixture and then the whole was polymerized for 60 minutes.

After that, at the temperature, 5.0 ml of isoprene and 5.0 ml of butadiene were added to the resultant at substantially the same time in one stroke, and then the mixture was subjected to a reaction. After the resultant had been left to stand for 2.4 minutes, the same amounts of isoprene and butadiene as those described in the foregoing were added to the resultant at substantially the same time in one stroke, and then the mixture was subjected to a reaction. The foregoing operations were repeatedly performed to finally add a total of 310 ml of isoprene and a total of 310 ml of butadiene. After that, a reaction was forced for an additional 90 minutes.

Further, at the temperature, 100 ml of styrene were added to the resultant and then the mixture was polymerized for 60 minutes. After that, the polymerization was stopped with 0.52 ml of methanol. Thus, a polymerization reaction liquid containing a block copolymer was obtained.

29.3 Grams of palladium on carbon (palladium-carrying amount: 5 mass %) as a hydrogenation catalyst were added to the reaction mixed liquid, and then a hydrogenation reaction was performed at a hydrogen pressure of 2 MPa and 150° C. for 10 hours. After the resultant had been left standing to cool and the pressure had been discharged, the palladium on carbon was removed by filtration, and then the filtrate was concentrated and vacuum-dried to provide a hydrogenated block copolymer (A-5).

Table 1 shows the results of the measurement of the physical properties of the resultant hydrogenated block copolymer (A-5).

Comparative Example 1

3,000 Milliliters of cyclohexane as a solvent and 9.2 ml of sec-butyllithium (cyclohexane solution) having a concentration of 10.5 mass % as an initiator were loaded into a pressure-resistant container that had been replaced with nitrogen and dried, and then the temperature of the mixture was increased to 60° C. After that, 100 ml of styrene were added to the mixture and then the whole was polymerized for 60 minutes.

After that, at the temperature, 5.4 ml of isoprene and 4.6 ml of butadiene were added to the resultant at substantially the same time in one stroke, and then the mixture was subjected to a reaction. After the resultant had been left to stand for 2.1 minutes, the same amounts of isoprene and butadiene as those described in the foregoing were added to the resultant at substantially the same time in one stroke, and then the mixture was subjected to a reaction. The foregoing operations were repeatedly performed to finally add a total of 334 ml of isoprene and a total of 284 ml of butadiene. After that, a reaction was forced for an additional 90 minutes.

Further, at the temperature, 100 ml of styrene were added to the resultant and then the mixture was polymerized for 60 minutes. After that, the polymerization was stopped with 0.52 ml of methanol. Thus, a polymerization reaction liquid containing a block copolymer was obtained.

29.3 Grams of palladium on carbon (palladium-carrying amount: 5 mass %) as a hydrogenation catalyst were added to the reaction mixed liquid, and then a hydrogenation reaction was performed at a hydrogen pressure of 2 MPa and 150° C. for 10 hours. After the resultant had been left standing to cool and the pressure had been discharged, the palladium on carbon was removed by filtration, and then the filtrate was concentrated and vacuum-dried to provide a hydrogenated block copolymer (A'-1).

Table 1 shows the results of the measurement of the physical properties of the resultant hydrogenated block copolymer (A'-1).

Comparative Example 2

3,000 Milliliters of cyclohexane as a solvent and 9.2 ml of sec-butyllithium (cyclohexane solution) having a concentration of 10.5 mass % as an initiator were loaded into a pressure-resistant container that had been replaced with nitrogen and dried, and then the temperature of the mixture was increased to 55° C. After that, 100 ml of styrene were added to the mixture and then the whole was polymerized for 60 minutes.

After that, at the temperature, 3.8 ml of isoprene and 6.2 ml of butadiene were added to the resultant at substantially the same time in one stroke, and then the mixture was subjected to a reaction. After the resultant had been left to stand for 3.8 minutes, the same amounts of isoprene and butadiene as those described in the foregoing were added to the resultant at substantially the same time in one stroke, and then the mixture was subjected to a reaction. The foregoing operations were repeatedly performed to finally add a total of 238 ml of isoprene and a total of 389 ml of butadiene. After that, a reaction was forced for an additional 90 minutes.

Further, at the temperature, 100 ml of styrene were added to the resultant and then the mixture was polymerized for 60 minutes. After that, the polymerization was stopped with 0.52 ml of methanol. Thus, a polymerization reaction liquid containing a block copolymer was obtained.

29.3 Grams of palladium on carbon (palladium-carrying amount: 5 mass %) as a hydrogenation catalyst were added to the reaction mixed liquid, and then a hydrogenation reaction was performed at a hydrogen pressure of 2 MPa and 150° C. for 10 hours. After the resultant had been left standing to cool and the pressure had been discharged, the palladium on carbon was removed by filtration, and then the filtrate was concentrated and vacuum-dried to provide a hydrogenated block copolymer (A'-2).

was increased to 54° C. After that, 100 ml of styrene were added to the mixture and then the whole was polymerized for 60 minutes.

After that, at the temperature, 4.1 ml of isoprene and 5.9 ml of butadiene were added to the resultant at substantially the same time in one stroke, and then the mixture was subjected to a reaction. After the resultant had been left to stand for 1.4 minutes, the same amounts of isoprene and butadiene as those described in the foregoing were added to the resultant at substantially the same time in one stroke, and then the mixture was subjected to a reaction. The foregoing operations were repeatedly performed to finally add a total of 256 ml of isoprene and a total of 369 ml of butadiene. After that, a reaction was forced for an additional 90 minutes.

Further, at the temperature, 100 ml of styrene were added to the resultant and then the mixture was polymerized for 60 minutes. After that, the polymerization was stopped with 0.52 ml of methanol. Thus, a polymerization reaction liquid containing a block copolymer was obtained.

29.3 Grams of palladium on carbon (palladium-carrying amount: 5 mass %) as a hydrogenation catalyst were added to the reaction mixed liquid, and then a hydrogenation reaction was performed at a hydrogen pressure of 2 MPa and 150° C. for 10 hours. After the resultant had been left standing to cool and the pressure had been discharged, the palladium on carbon was removed by filtration, and then the filtrate was concentrated and vacuum-dried to provide a hydrogenated block copolymer (A'-3).

Table 1 shows the results of the measurement of the physical properties of the resultant hydrogenated block copolymer (A'-3).

TABLE 1

|  | Example | | | | | Comparative Example | | |
|---|---|---|---|---|---|---|---|---|
|  | 1 | 2 | 3 | 4 | 5 | 1 | 2 | 3 |
| Hydrogenated block copolymer | (A-1) | (A-2) | (A-3) | (A-4) | (A-5) | (A'-1) | (A'-2) | (A'-3) |
| Styrene content (mass %) | 30 | 30 | 32 | 30 | 30 | 30 | 30 | 30 |
| Isoprene/1,3-butadiene (mass ratio) | 45/55 | 43/57 | 47/53 | 45/55 | 52/48 | 56/44 | 40/60 | 43/57 |
| Weight-average molecular weight | 97,400 | 96,500 | 107,700 | 97,100 | 96,900 | 97,900 | 99,700 | 98,400 |
| Molecular weight distribution | 1.03 | 1.02 | 1.03 | 1.03 | 1.02 | 1.03 | 1.03 | 1.03 |
| Hydrogenation ratio (%) | 98.2 | 97.6 | 98.0 | 98.1 | 98.2 | 98.2 | 97.6 | 98.4 |
| Amount of 1,4-bonds (%) | 93 | 92 | 92 | 93 | 92 | 93 | 93 | 93 |
| Crystallization peak temperature (° C.) | 6.7 | 11.8 | 10.3 | 13.2 | 1.0 | −5.1 | 16.1 | 19.6 |
| Crystal melting heat quantity (mJ/mg) | 19.1 | 23.7 | 20.3 | 20.7 | 17.2 | 13.7 | 22.4 | 24.8 |
| Glass transition temperature (° C.) | −52 | −52 | −53 | −50 | −53 | −54 | −50 | −52 |
| Tensile strength (MPa) | 43.2 | 42.8 | 42.4 | 41.4 | 38.2 | 34.5 | 47.3 | 42.3 |
| Elastic recovery | 0.49 | 0.34 | 0.38 | 0.34 | 0.55 | 0.63 | 0.28 | 0.18 |
| Abrasion resistance (mm$^3$) | 143 | 145 | 144 | 147 | 147 | 152 | 141 | 148 |

Table 1 shows the results of the measurement of the physical properties of the resultant hydrogenated block copolymer (A'-2).

Comparative Example 3

3,000 Milliliters of cyclohexane as a solvent and 9.2 ml of sec-butyllithium (cyclohexane solution) having a concentration of 10.5 mass % as an initiator were loaded into a pressure-resistant container that had been replaced with nitrogen and dried, and then the temperature of the mixture Examples 6 to 13 and Comparative Examples 4 to 6

Each of the hydrogenated block copolymers produced in Examples 1 to 5 and Comparative Examples 1 to 3, the polystyrene-based resin (B'), and the softener for a rubber (C) were blended at ratios (unit: part(s) by mass) shown in Table 2. Further, 0.1 mass % of a phenol-based antioxidant "IRGANOX 1010" with respect to all components was added and then the components were preliminarily mixed. After that, the mixture was melted and kneaded with a Brabender mixer at 230° C. for 5 minutes to provide a thermoplastic elastomer composition. Table 2 shows the results of the measurement of the physical properties of the resultant thermoplastic elastomer composition.

TABLE 2

| | Example | | | | | | | | Comparative Example | | |
|---|---|---|---|---|---|---|---|---|---|---|---|
| | 6 | 7 | 8 | 9 | 10 | 11 | 12 | 13 | 4 | 5 | 6 |
| Hydrogenated block copolymer (A) | | | | | | | | | | | |
| (A-1) | 55 | | | | | 60 | 62 | 70 | | | |
| (A-2) | | 55 | | | | | | | | | |
| (A-3) | | | 55 | | | | | | | | |
| (A-4) | | | | 55 | | | | | | | |
| (A-5) | | | | | 55 | | | | | | |
| (A'-1) | | | | | | | | | 55 | | |
| (A'-2) | | | | | | | | | | 55 | |
| (A'-3) | | | | | | | | | | | 55 |
| Polystyrene-based resin (B') *1 | 15 | 15 | 15 | 15 | 15 | 6 | 8 | 10 | 15 | 15 | 15 |
| Softener for a rubber (C) *2 | 30 | 30 | 30 | 30 | 30 | 34 | 30 | 20 | 30 | 30 | 30 |
| Tensile strength (MPa) | 24.7 | 25.4 | 24.0 | 24.8 | 21.6 | 22.9 | 25.5 | 31.3 | 20.3 | 26.2 | 25.3 |
| Elastic recovery | 0.83 | 0.75 | 0.78 | 0.71 | 0.84 | 0.83 | 0.81 | 0.72 | 0.88 | 0.66 | 0.60 |

(Description of notes in Table 2)
*1: AGPPS (trade name: 679, manufactured by PS Japan Corporation, MFR = 18 g/10 min, weight-average molecular weight: 199,000)
*2: A paraffin-based process oil (trade name: Diana Process Oil PW-90, manufactured by Idemitsu Kosan Co., Ltd., kinetic viscosity at 40° C.: 95.54 mm$^2$/s)

It is understood from the results of Table 1 that the hydrogenated block copolymer (A) of the present invention is excellent in both tensile strength and elastic recovery, and has good abrasion resistance. It is understood from the results of Table that a thermoplastic elastomer composition containing the hydrogenated block copolymer is excellent in both tensile strength and elastic recovery. In addition, it can be said that the abrasion resistance of the thermoplastic elastomer composition containing the hydrogenated block copolymer (A) of the present invention is also good because the abrasion resistance of the hydrogenated block copolymer (A) is good.

INDUSTRIAL APPLICABILITY

The hydrogenated block copolymer of the present invention is excellent in tensile strength, elastic recovery, abrasion resistance, flexibility, and weatherability, and is free of any substance that causes environmental pollution. Accordingly, the copolymer can be used in various fields such as daily necessities, industrial goods, automobile supplies, home appliances, food containers, packaging materials, medical supplies, miscellaneous goods, and sporting goods by taking advantage of its features.

The invention claimed is:
1. A thermoplastic elastomer composition, comprising:
a hydrogenated block copolymer (A);
a thermoplastic resin (B); and
a rubber softener (C);
wherein:
the hydrogenated block copolymer is obtained by hydrogenating a block copolymer having:
two or more polymer blocks (a) each containing a structural unit derived from an aromatic vinyl compound; and
one or more polymer blocks (b) each containing structural units derived from isoprene and 1,3-butadiene;

the hydrogenated block copolymer has a crystallization peak temperature (Tc) of 2 to 15° C.;
the crystallization peak temperature (Tc) is a peak top temperature of an exothermic peak observed when a temperature of a sample of the hydrogenated block copolymer is increased from 30° C. to 150° C. at a rate of 10° C./min and then the sample is cooled to −100° C. at a rate of 10° C./min, the peak top temperature being measured with a differential scanning calorimeter (DSC); and
a content of the polymer blocks (a) in the hydrogenated block copolymer is 20 to 34 mass %.
2. The thermoplastic elastomer composition according to claim 1, wherein a content of the polymer blocks (a) in the hydrogenated block copolymer is 25 to 33 mass %.
3. The thermoplastic elastomer composition according to claim 1, wherein a glass transition temperature (Tg) of the hydrogenated block copolymer (A) is −60 to −30° C.
4. The thermoplastic elastomer composition according to claim 1, wherein a glass transition temperature (Tg) of the hydrogenated block copolymer (A) is −55 to −45° C.
5. The thermoplastic elastomer composition according to claim 1, wherein a crystal melting heat quantity of the hydrogenated block copolymer (A) is 15 to 30 mJ/mg.
6. The thermoplastic elastomer composition according to claim 1, wherein a crystal melting heat quantity of the hydrogenated block copolymer (A) is 17 to 25 mJ/mg.
7. The thermoplastic elastomer composition according to claim 1, wherein a tensile strength of the hydrogenated block copolymer (A) is 40 to 45 MPa.
8. The thermoplastic elastomer composition according to claim 1, wherein an elastic recovery of the hydrogenated block copolymer (A) is 0.3 to 0.5.
9. A thermoplastic elastomer composition, comprising:
a hydrogenated block copolymer (A);
a thermoplastic resin (B); and
a rubber softener (C);
wherein:
the composition comprises:

50 to 80 parts by mass of the hydrogenated block copolymer (A) based on 100 parts by weight of (A), (B), and (C);

5 to 30 parts by mass of the thermoplastic resin (B) based on 100 parts by weight of (A), (B), and (C); and 10 to 45 parts by mass of the rubber softener (C) based on 100 parts by weight of (A), (B), and (C);

the hydrogenated block copolymer is obtained by hydrogenating a block copolymer having:

two or more polymer blocks (a) each containing a structural unit derived from an aromatic vinyl compound; and one or more polymer blocks (b) each containing structural units derived from isoprene and 1,3-butadiene;

the hydrogenated block copolymer has a crystallization peak temperature (Tc) of −3 to 15° C.;

the crystallization peak temperature (Tc) is a peak top temperature of an exothermic peak observed when a temperature of a sample of the hydrogenated block copolymer is increased from 30° C. to 150° C. at a rate of 10° C./min and then the sample is cooled to −100° C. at a rate of 10° C./min, the peak top temperature being measured with a differential scanning calorimeter (DSC); and a content of the polymer blocks (a) in the hydrogenated block copolymer is 20 to 34 mass %.

10. The thermoplastic elastomer composition according to claim 9, wherein the thermoplastic resin (B) comprises a polystyrene-based resin (B').

11. The thermoplastic elastomer composition according to claim 1, wherein the thermoplastic resin (B) comprises a polystyrene-based resin (B').

12. The thermoplastic elastomer composition according to claim 1, wherein the thermoplastic resin (B) comprises at least one member selected from the group consisting of a polyethylene-based resin, a polypropylene-based resin, an acrylic resin, a polyphenylene ether-based resin, a polycarbonate-based resin, a polyvinyl acetate-based resin, a polyester-based resin, a polyamide-based resin, and a polyvinyl chloride-based resin.

13. The thermoplastic elastomer composition according to claim 1, wherein the rubber softener (C) comprises at least one member selected from the group consisting of a paraffin-based process oil, a naphthene-based process oil, peanut oil, rosin, a phosphoric acid ester, a low-molecular-weight polyethylene glycol, liquid paraffin, a low-molecular-weight polyethylene, an ethylene-α-olefin co-oligomer, liquid polybutene, liquid polyisoprene, hydrogenated liquid polyisoprene, liquid polybutadiene, and hydrogenated liquid polybutadiene.

14. The thermoplastic elastomer composition according to claim 1, wherein:

the crystallization peak temperature of the hydrogenated block copolymer is 2 to 13° C.;

an amount of 1,4-bonds in the hydrogenated block copolymer formed from the structural units derived from isoprene and butadiene of 90 to 95%; and 96 to 100% of carbon-carbon double bonds in the hydrogenated block copolymer derived from isoprene and butadiene are hydrogenated.

15. The thermoplastic elastomer composition according to claim 9, wherein:

the crystallization peak temperature of the hydrogenated block copolymer is 2 to 13° C.;

an amount of 1,4-bonds in the hydrogenated block copolymer formed form the structural units derived from isoprene and butadiene of 90 to 95%; and 96 to 100% of carbon-carbon double bonds in the hydrogenated block copolymer derived from isoprene and butadiene are hydrogenated.

16. The thermoplastic elastomer composition according to claim 1, wherein the crystallization peak temperature of the hydrogenated block copolymer is 5 to 13° C.

17. The thermoplastic elastomer composition according to claim 9, wherein the crystallization peak temperature of the hydrogenated block copolymer is 5 to 13° C.

* * * * *